June 24, 1969  KIHACHI CHIMURA  3,451,347
VISCOUS SUSPENSION PUMPING MEANS
Filed Aug. 16, 1967  Sheet 3 of 5

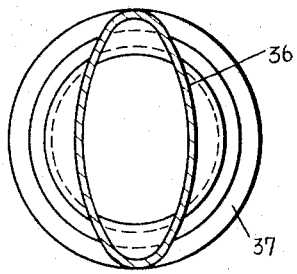
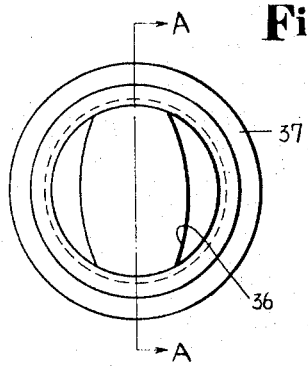
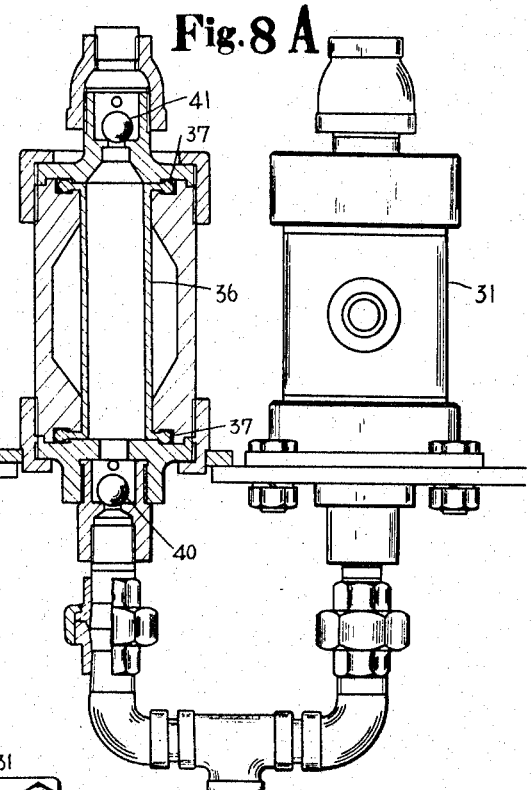
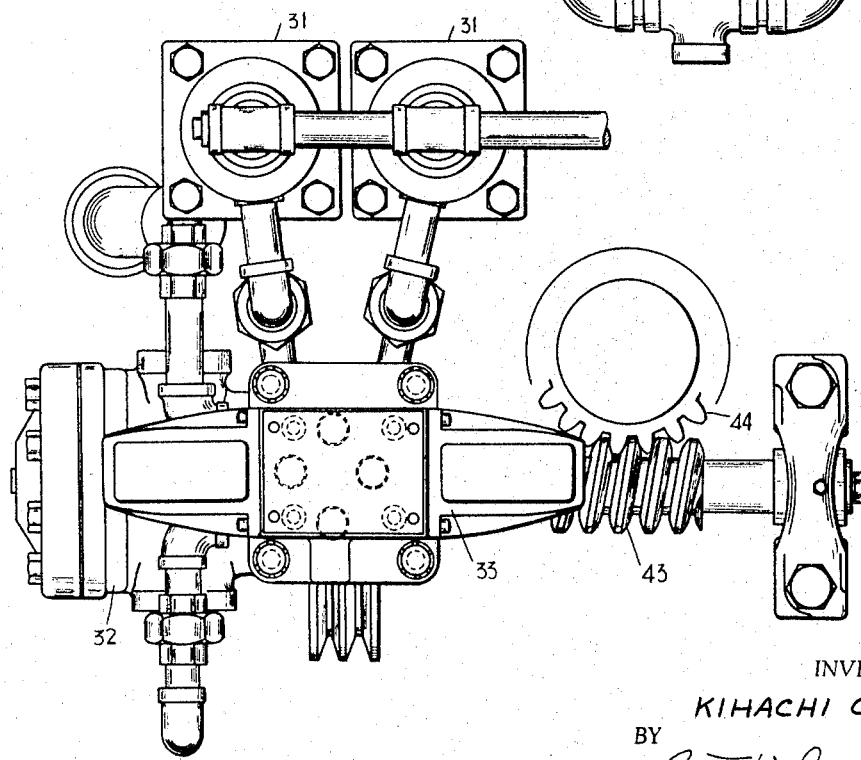

INVENTOR.
KIHACHI CHIMURA
BY
ATTORNEY

June 24, 1969

KIHACHI CHIMURA 3,451,347

VISCOUS SUSPENSION PUMPING MEANS

Filed Aug. 16, 1967

INVENTOR.
KIHACHI CHIMURA
BY
ATTORNEY

United States Patent Office 3,451,347
Patented June 24, 1969

3,451,347
VISCOUS SUSPENSION PUMPING MEANS
Kihachi Chimura, Yokohama, Japan, assignor to Kabushiki Kaisha Inouye Shokai (Inouye & Co., Ltd.), Yokohama, Japan
Filed Aug. 16, 1967, Ser. No. 661,083
Claims priority, application Japan, June 19, 1967, 42/38,825; June 29, 1967, 42/41,288
Int. Cl. F04b *43/04, 17/00*
U.S. Cl. 103—152
3 Claims

ABSTRACT OF THE DISCLOSURE

This disclosure relates to a viscous suspension pumping means comprising a pair of expansible and collapsible chambers made of, for example, neoprene, which are alternately oppositely deformed by a hydraulic medium constantly pressured by a hydraulic pump. The alternation is controlled by a valve controlled by the hydraulic pump. This means is characterized by a constant pressure given to the output and being measurable, and portable, which is enhanced by an automatic rotating direction regulating means for a built-in three-phase motor.

BACKGROUND OF THE INVENTION

*Field of the invention.*—The field of art to which this invention is to be classified is the construction of the pump, and particularly of the diaphragm pump. This invention relates also to a means for controlling a three-phase motor built into the pumping means. This invention would be classified into class 103, subclass 148 of the U.S. patent classification and also referred to class 172, subclass 280.

*Description of the prior art.*—Heretofore, it has been appreciably difficult to transport a viscous suspension such as a coating material through a pipe. The conventional plunger pump can only with difficulty transport such a viscous suspension containing hard and coarse suspended phase as a coating material for the airless coating due to the fact that the inorganic zinc particles and other pigment particles adhere to the walls of the pumping chamber and penetrate into various clearances for the sliding and rotating members resulting in clogging and wearing of the pump. In some instances, the operation can only be continued for half an hour after the start of the operation.

For driving such a pumping means, it is more advantageous to use a three-phase motor than a single-phase motor in view of the portability. However, the three-phase motor is apt to be improperly connected to a power source. Even a plug socket for the three-phase is available, the connection of the three-phase motor with a power has not been facilitated. If the R phase is mistaken for the T phase, the three-phase motor would be rotated in the wrong direction resulting in damage to the motor and to the pumping means. Under these circumstances, it has been impossible to avoid building in a large and heavy single-phase motor for driving the pumping means.

SUMMARY OF THE INVENTION

Briefly stated in accordance with one aspect of this invention, there is provided a viscous suspension pumping means comprising a pair of pulsating pumps, a hydraulic pump, and a transferring means. Each of the pulsating pumps, arranged in parallel, comprises an expansible and collapsible chamber having an inlet check valve for a joint inlet and an outlet check valve for a joint outlet for the pair through which the viscous suspension is passed unidirectionally, and being adapted to be periodically alternately deformed by a hydraulic medium surrounding the chambers. The hydraulic medium is maintained under pressure by a hydraulic pump. The connection for the hydraulic medium between an inlet of the hydraulic pump and the outside of one of the chambers is automatically periodically altered to that between an outlet of the hydraulic pump and the outside of the other of the chambers and vice versa by the action of the transferring means. The transferring means is driven by the hydraulic pump which is driven by a motor.

The motor is preferably a three-phase motor. In accordance with this invention, the three-phase motor has associated therewith a rotating direction regulating means comprising a pawl radially protruded on a shaft driven by the motor, a contactor adapted to be swung by the action of the pawl when brought into an active position, an electromagnet adapted to be energized together with the motor so as to bring the contactor into the active position, and a pair of microswitches adapted to be made by the action of the contactor when the contactor is swung, respectively, one of the pair functionating for changing over the R phase with the T phase of the three-phase power and the other of the pair functionating for deenergizing the electromagnet so as to bring the contactor out of the active position.

By virtue of this invention, it is possible to transport a viscous suspension through a pipe in situ without any structural damage to the pump.

By virtue of this invention, it is possible to directly read a pressure applied to the viscous suspension being transported through a pipe.

By virtue of this invention, it is possible to use a three-phase motor built into the viscous suspension pumping means without any trouble due to an error in connection with a power source. By virtue of this fool-proof means in accordance with this invention, the viscous suspension pumping means is more readily portable.

The invention will be better understood and other objects and additional advantages of the invention will become apparent upon perusal of the following description taken in connection with the accompanying drawings.

BRIEF DESCRIPTION OF THE DRAWING

In the drawings.

FIG. 4 is a cross-sectional view thereof taken along the line B—B of FIG. 3;

FIG. 5 is a left side elevational view thereof, of which the longitudinal sectional view taken along the line A—A corresponds to the FIG. 3;

FIG. 8–A is a view partly in section and partly in front elevation of a pair of pulsating pumps in the embodiment;

FIG. 8–B is a plan view thereof;

FIG. 9–B is a view thereof partly in section and partly in side elevation;

DESCRIPTION OF THE PREFERRED EMBODIMENT

Figure 1:
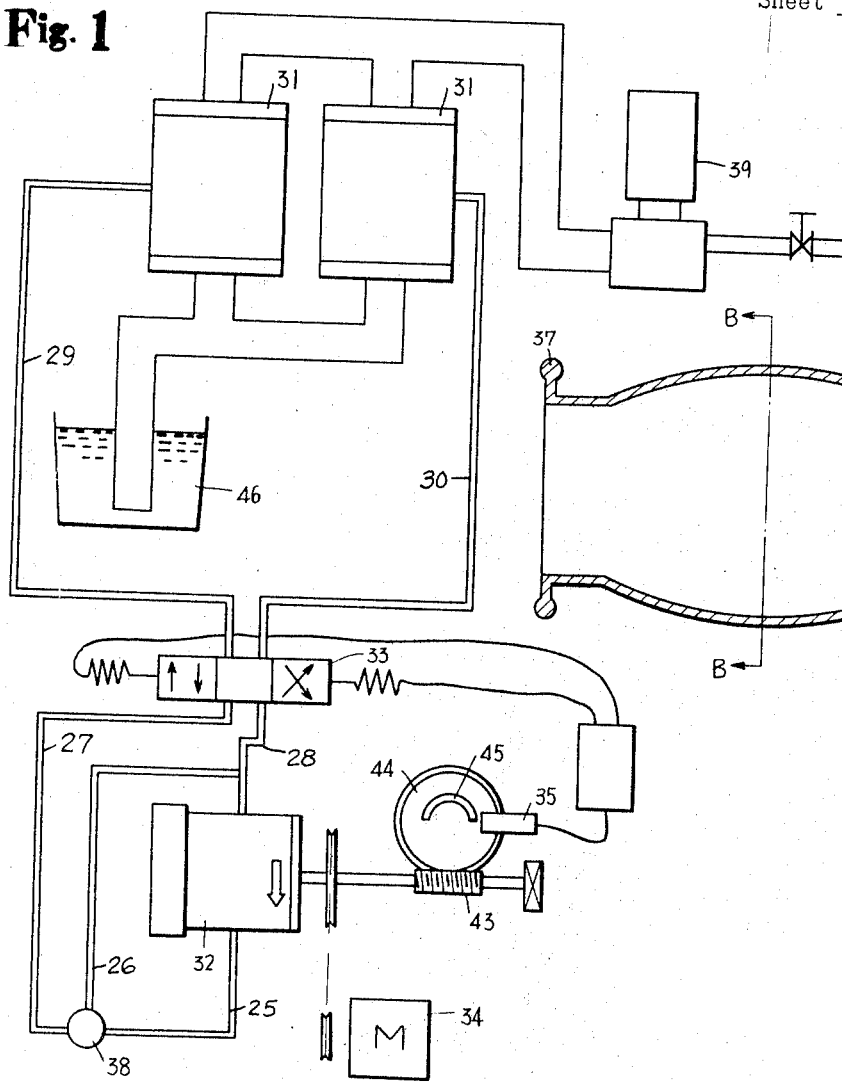
FIG. 1 is a schematic view of an embodiment of this invention.
Figure 3:
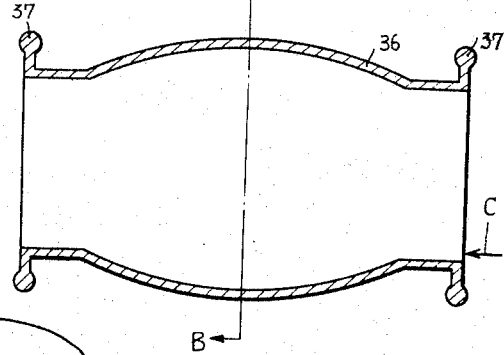
FIG. 3 is a longitudinal sectional view of a deformable chamber in the pulsating pump in an expanded position.

Referring more particularly to the drawings, the preferred embodiment of this invention will now be described; however, this description will be understood to be illustrative of the invention and not as limiting it to the particular construction and arrangement shown and described. This viscous suspension pumping means comprises a pair of pulsating pumps 31, a hydraulic pump 32, a solenoid-operated valve 33, a relief valve 38, an electric motor 34, and a solenoid transferring means 35. A fluid connection 25 is provided between the pump 32 and the relief valve 38, a fluid connection 27 is provided between solenoid operated valve 33 and the relief valve 38, and a fluid connection 28 is provided between the solenoid operated valve 33 and the pump 32 with a bypass connection 26 connecting the fluid connection 28 and the valve 38. Fluid connections 29 and 30 are provided between the solenoid operated valve 33 and the pair of pulsating pumps 31. The inlets of the pulsating pumps 31 are joined with each other and connected with a viscous suspension reservoir 46.

Figure 2:
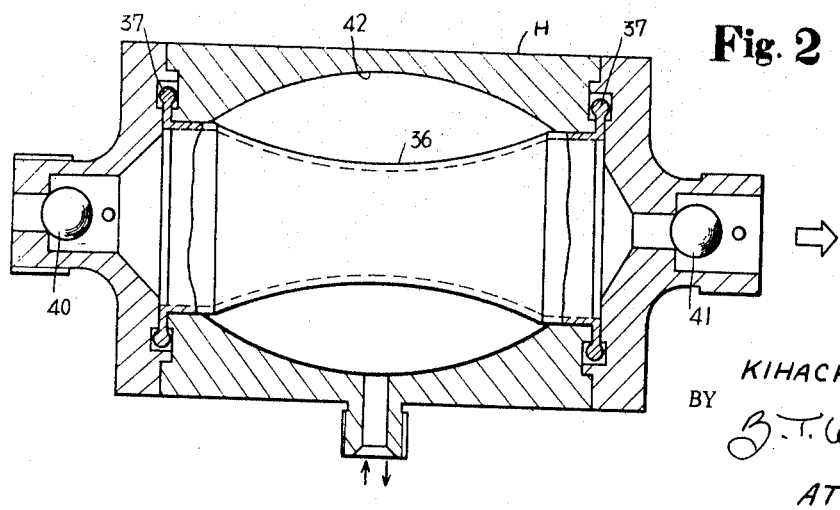
FIG. 2 is a longitudinal sectional view of a pulsating pump in the embodiment.

The pulsating pump 31 is provided with two check valves 40 and 41 at opposite ends, which act in the opposite directions with respect to each other, as shown in FIG. 2. An expansible and collapsible tubular chamber 36 is arranged inside a cavity 42 of a housing H. The viscous suspension is admitted into the chamber 36 and pushed out thereof by the action of a hydraulic pressure subjected to the outside of the deformable chamber and periodically increased and decreased, which is supplied to the space between the inner wall of the cavity 42 and the outer wall of the chamber 36 from the hydraulic pump 32.

The chamber 36 is made of neoprene or other soft chemical-resisting material, of which the Shore hardness is 30–40, and has an elliptic cross-section at the longitudinal center thereof. There is a flange at each longitudinal end of the chamber 36, which is integral with an O-ring 37, of which the Shore hardness is 55–65. It is possible to substitute an expansible and collapsible metal structure for the neoprene chamber 36.

The chamber 36 is positively and negatively pressured by a hydraulic medium controlled by the hydraulic pump 32. The hydraulic medium may be a hydraulic oil. A solenoid-operated valve 33 provided between the hydraulic pump 32 and the pair of pulsating pumps 31 controls the flow of the hydraulic medium in such a manner that the solenoid-operated valve 33 is transferred from the feeding position to the exhausting position and vice versa for the pulsating pump alternately periodically at intervals of a time constant by means of a solenoid transferring means 35, so that the viscous suspension is pumped under an elevated pressure in proportion to the pressure subjected to the hydraulic medium.

The hydraulic pump 32 is provided with a worm 43 integral with the shaft thereof. The worm 43 rotates a worm wheel 44 on which a protrusion 45 is provided and adapted to be fixed therewith at optional angular positions. This protrusion 45 acts with the solenoid transferring means 35 every one-fourth, one-third, one-half, or one turn of the worm wheel 44 for changing over a circuit for energizing the solenoid 33. In addition, it is possible to adjust the throughput of the pulsating pump 31 by adjusting the length of the interval between the successive transferences in the solenoid-operated valve 33. The outlet and inlet of the hydraulic pump 32 are connected with the pair of pulsating pumps 31 intermediate the solenoid-operated valve 33 in such a manner that the chambers 36 of the pair of pulsating pumps 31 are alternately expanded and collapsed in accordance with the control of the solenoid-operated valve 33.

Figure 6:
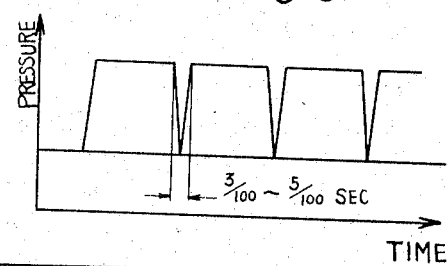
FIG. 6 shows a pressure curve of an output of the embodiment.
Figure 9:
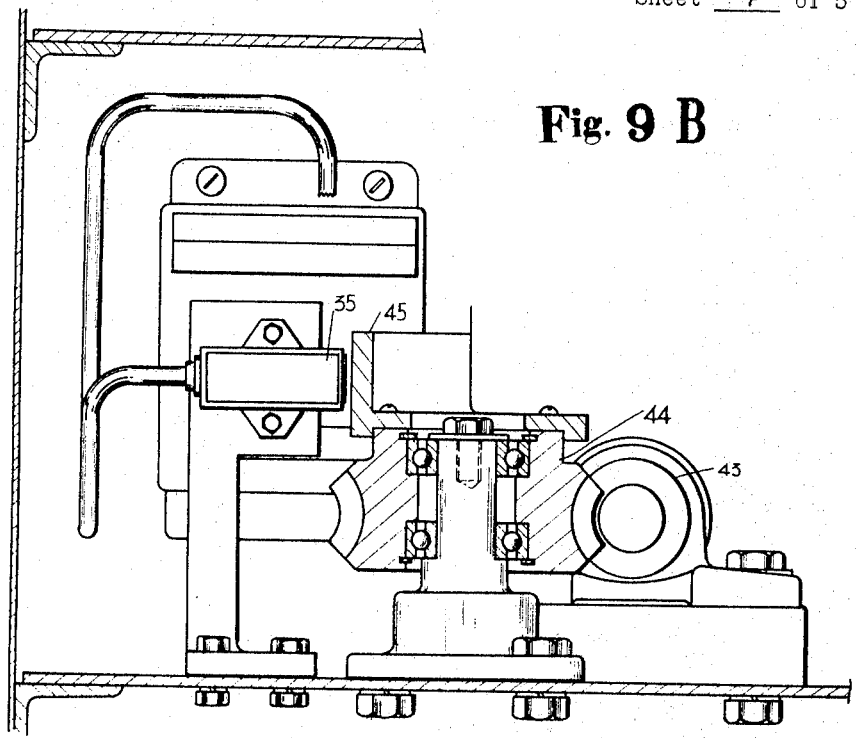
FIG. 9–A is a plan view of a transferring means in the embodiment.
Figure 9:
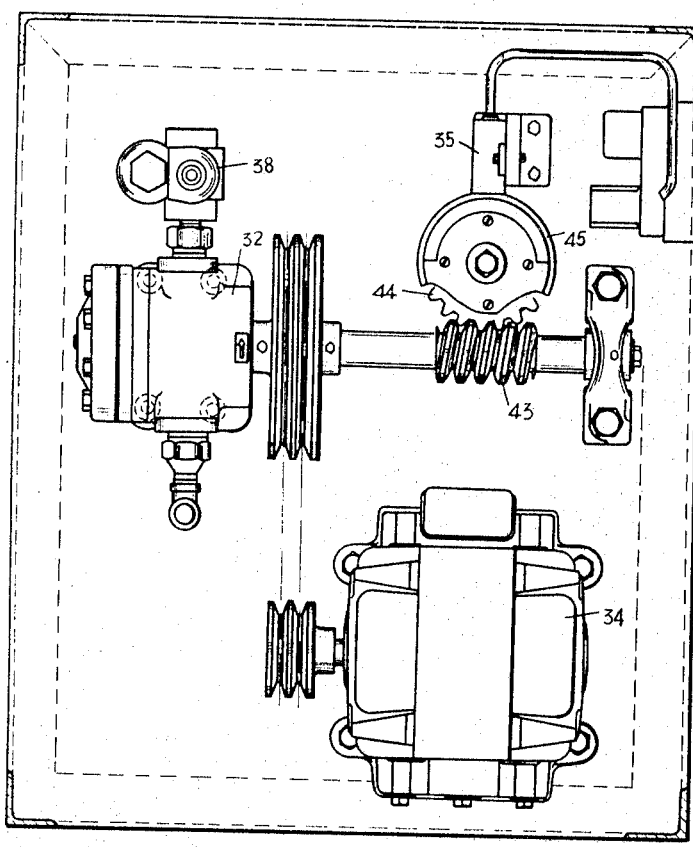

By virtue of the fact that the transference in the solenoid-operated valve 33 is instantaneous whereby the transference in the pair of the pulsating pumps 31 is also instantaneous, the joint outputs of the pair are not affected in pressure by the transference as shown in FIG. 6. A time lag of a matter of 2–3/100 sec. affects to the pressure in the joint outputs a little so that an extremely small accumulator 39 may be satisfactorily useful. Even if such an accumulator is not provided, this viscous suspension pumping means is useful.

There is provided in the output side of the hydraulic pump 32 a relief valve 38 which functionates for returning an excess of the hydraulic medium to the input side of the hydraulic pump 32 when the pressure is elevated over a set value. By virtue of this relief valve 38, it is possible to maintain the set value of pressure. The pressure may be measured by a pressure gauge (not shown). In accordance with this invention, it is possible to directly read the value in pressure in the hydraulic medium and the viscous suspension. It has heretofore been difficult to practically measure such a value, which is very useful for controlling the viscous suspension.

In accordance with this invention, the hydraulic pump 32 is directly driven by an electric motor 34, which is preferably a three-phase motor, while compressed air is used as an intermediate in accordance with the prior art. Therefore, the viscous suspension pumping means in accordance with this invention is excellent in mechanical efficiency. In addition, such an additional means as an air compressor is not required.

Although this embodiment is provided with a solenoid-operated valve 33, it is possible to substitute a mechanically operated valve for the solenoid-operated valve.

It is to be seen that the motor 34 may be a three-phase motor and, in accordance with this invention, the three-phase motor 34 is provided with a rotating direction regulating means.

Figure 11:
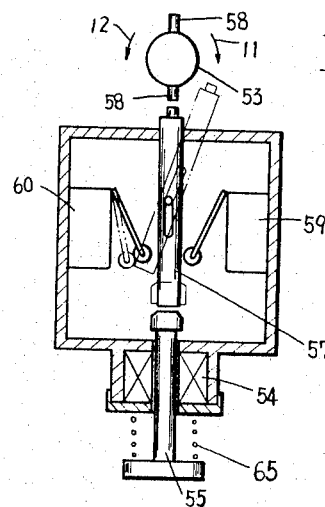
FIG. 11 is a schematic view of a mechanical portion of the means in inactive position.
Figure 7B:
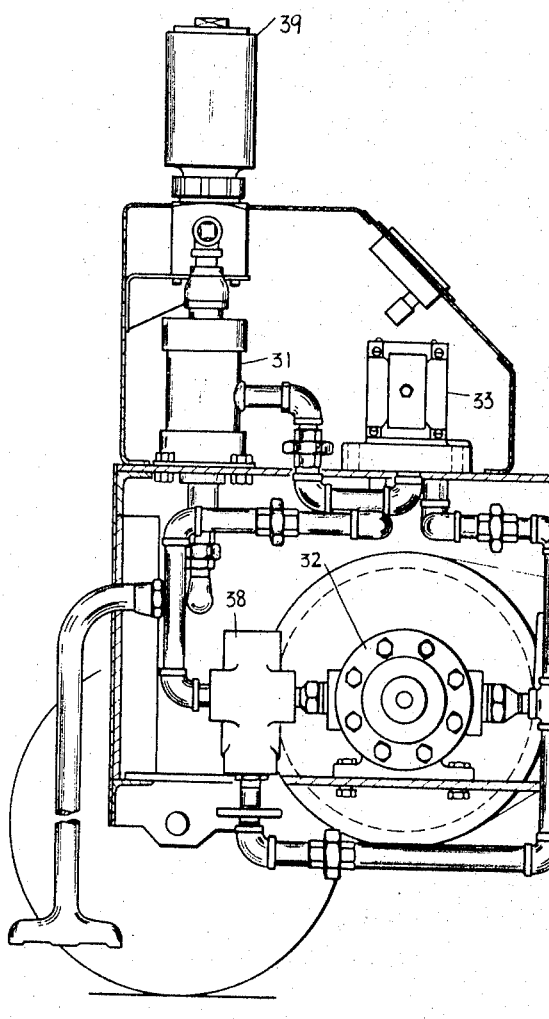
FIGS. 7–A and 7–B are a front elevational view and a side elevational view of the embodiment of this invention, respectively.
Figure 10:
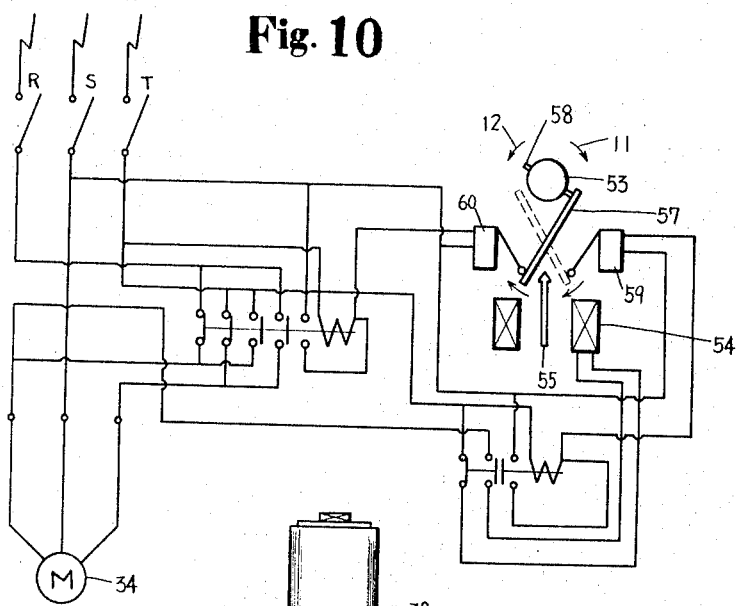
FIG. 10 is a schematic mechanical and electrical connection diagram of a rotating direction regulating means for a three-phase motor embodying this invention.
Figure 7A:
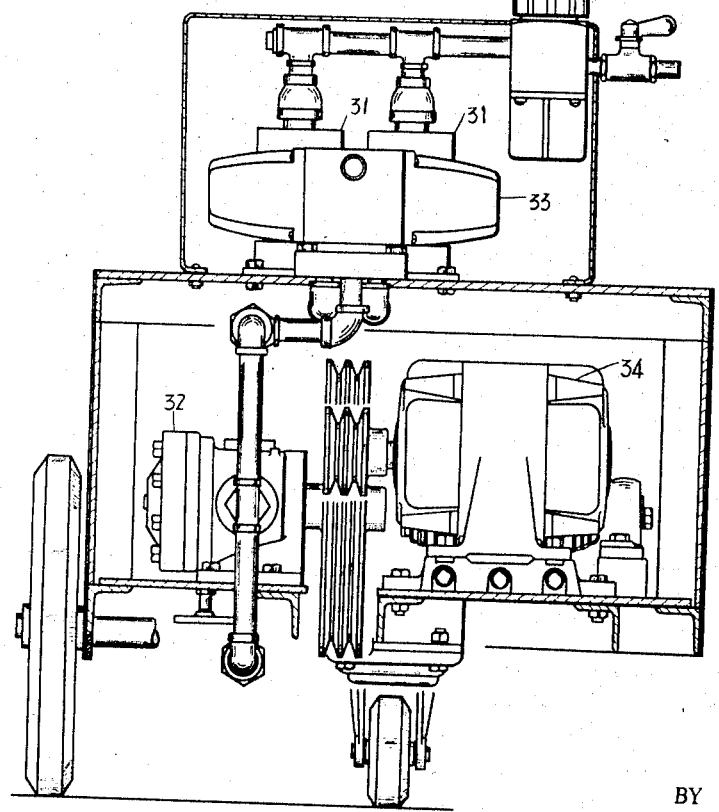

Referring more particularly to FIGS. 10 and 11, the rotating direction regulating means comprises a pawl 58 radially protruded on a shaft 53 driven by the motor 34, a contactor 57 adapted to be swung by the pawl 58 when the contactor 57 is in its active position, an electromagnet 54 which brings the contactor 57 into the active position, and a pair of microswitches 59 and 60 adapted to be actuated by the contactor 57 when it swings.

In operation, when the motor 34 is energized, the electromagnet 54 is also energized at the same time, so that an amature 55 is raised against the action of a spring 65. On the armature 55 is placed axially the contactor 57 which is adapted not only to move axially but also to swing on a radial axis. The contactor 57 thus raised by the armature 55 is brought into its active position where the top end of the contactor 57 is brought into contact with the pawl 58 when the shaft 53 is rotated. Now if the three-phase motor 34 is properly connected with a power source, the shaft 53 is rotated in the clockwise direction so that the top of the contactor 57 is swung in the counterclockwise direction by being pushed by the pawl 58 during the starting period of the rotation. When the contactor 57 is so swung the same acts on the first micrroswitch 59 so as to actuate the same which deenergizes the electromagnet 54. When the electromagnet 54 is deenergized, the armature 55 is lowered by the action of the spring 65 so that the contactor 57 is also lowered resulting in to be brought out of the active position. Thus proper rotation of the motor 34 together with the shaft 53 may be continued.

When the three-phase motor 34 has been improperly connected with respect to the power source, that is to say, if the R phase is connected with T phase, the motor 34 does not rotate in the proper direction or the clockwise direction but rotates reversely. Under these circumstances, the electromagnet 54 is energized at the same time similarly to the case where the connection of the motor 34 with the power source is correct, so that the armature 55 is raised and, in turn, the contactor 57 is brought into its active position. However, when the top is brought into contact with the pawl 58, the pawl 58 makes the contactor 57 swing in the clockwise direction but not in the counterclockwise direction because the shaft 53 is rotated in the counterclockwise direction. Thus the contactor 57 makes the second microswitch 60 which changes over from the R phase to T phase and from the T phase to R phase of the input, whereby the three-phase motor 34 is once stopped and rotated reversely with respect to the above direction. When the motor 34 is once stopped, the electromagnet 54 is deenergized similarly to the previous case so that the armature 55 and the contactor 57 are restored to the original inactive position. Then by the action of the motor 34 again started, the parts are again operated similarly to in the previous case, resulting in to be again restored.

While a particular embodiment of this invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What is claimed as new and desired to be secured by Letters Patent of the United States is:

1. A viscous suspension pumping means including:
    a pair of pulsating pumps, each including a space filled with hydraulic medium enclosed in a cavity and surrounding a chamber bounded by a wall,
    said chamber wall being expansible and collapsible and said chamber having an inlet check valve for a common inlet and an outlet check valve for a common outlet, respectively of said viscous suspension, and said chamber being connected in parallel relation with each other in a circuit of said viscous suspension,
    a hydraulic pump having an inlet and an outlet,
    members for periodically connecting one of said spaces alternately with said pump inlet and outlet with the other of said spaces being reversely connected for alternate expansion and collapse of said chamber walls and driving of the viscous suspension unidirectionaly through the circuit,
    said members including:
        a solenoid-operated control valve having two positions, one for parallel connection of the pair of said last named outlet and said last named inlet with the pair of said two spaces, and the other for cross connection of last named two pairs,
        a solenoid transferring means, and
        a three-phase motor for driving said hydraulic pump and said transferring means.
2. A viscous suspension pumping means as defined in claim 1 which further includes:
    a rotating direction regulating means for controlling said three-phase motor.
3. A viscous suspenstion pumping means as defined in claim 2 in which said regulationg means includes:
    a pawl carried on a shaft driven by said motor,
    a contactor adapted to be swung by the action of said pawl when brought into an active position,
    an electromagnet adapted to be energized together with said motor so as to bring said contactor into said active position, and
    a pair of microswitches adapted to be activated by the action of said contactor when the same is swung, respectively,
    one of last named pair changing over the phase input of said motor and the other of said last named pair deenergizing said electromagnet so as to bring the contactor out of said active position.

References Cited

UNITED STATES PATENTS

| | | |
|---|---|---|
| 2,291,912 | 8/1942 | Meyers. |
| 3,048,121 | 8/1962 | Sheesley _____ 103—152 |
| 3,250,226 | 5/1966 | Voelker _____ 103—152 |

ROBERT M. WALKER, *Primary Examiner.*

U.S. Cl. X.R.

103—49